United States Patent [19]

Gregg

[11] Patent Number: 5,077,724
[45] Date of Patent: Dec. 31, 1991

[54] OPTICAL TAPE CARTRIDGE

[75] Inventor: David P. Gregg, Culver City, Calif.

[73] Assignee: Del Mar Avionics, Irvine, Calif.

[21] Appl. No.: 355,319

[22] Filed: May 22, 1989

[51] Int. Cl.⁵ ............................................. G11B 23/02
[52] U.S. Cl. .................................. 369/258; 369/272;
360/132
[58] Field of Search ............... 369/258, 274, 280, 292, 369/272–273; 360/132, 134, 137

[56] References Cited

U.S. PATENT DOCUMENTS

| 4,608,616 | 8/1986 | Wakui et al. | 360/132 |
| 4,646,190 | 2/1987 | Meguro | 360/132 |
| 4,656,548 | 4/1987 | Pfefferkorn et al. | 360/132 |
| 4,814,925 | 3/1989 | Beaujean | 360/132 |
| 4,905,112 | 2/1990 | Rhodes | 360/132 |
| 4,945,440 | 7/1990 | Iwahashi et al. | 360/132 |

Primary Examiner—William M. Shoop, Jr.
Assistant Examiner—David Martin
Attorney, Agent, or Firm—W. D. English; J. D. Leimbach

[57] ABSTRACT

The invention is a sealed optical tape cassette. Sealed means is employed to pull optical tape across a mobile recording bridge situated behind a transparent window. Bridge is operated upon by a pair of sealed internal/external pins to control tape tilt, focus and tracking of a light beam from a spinning optical head in a recorder/player to a desired point on the optical tape.

8 Claims, 4 Drawing Sheets

OPTICAL TAPE CARTRIDGE

BACKGROUND OF THE INVENTION

1. Field of the Invention

The invention lies in the domain of operable packaging of data recording devices and means. More particularly the invention relates to optical tape recording cartridges.

2. Description of the Prior Art

Tape recording and reading of data and, of course, operable packaging thereof for convenience of recording, playing, promoting and distributing the same have been around for some time to include punched paper tape, magnetic tape, being readable by magnetic means; and, more recently, optically recordable tape with both RAM (erasable) and ROM applications, being readable by optical means. Indeed, numerous magnetic tape cartridges, cassettes and video tape cartridges, and even floppy disc and optical disc envelopes have been designed with convenience of use and application in mind as well as for protection of the tape or disc and data thereon.

In all prior tape applications, however, it was necessary that the tape physically pass over or be wrapped around a read/write head. One such version caused magnetic tape to be vacuum sucked into curved contact with a concave receptacle. A rapidly spinning, circular read/write head array in quadrature, of same radius of curvature as the concave receptacle, would then write/read data across the tape width in a direction almost orthogonal to direction of travel of the tape. In effect the tape was wrapped around a portion of the periphery of a read/write head array. Subsequently, it was found that more data could be recorded by increasing the angle of the recording path from the orthogonal; i.e., this was acomplished by changing the angle of the write/read head from the nearly transverse to a very much reduced angle more parallel, logitudinally to the direction of tape travel, as practiced by AMPEX.

Subsequent to the AMPEX concept, a Sony "U-matic" tape recording concept emerged, wherein the tape was physically passed nominally 180° around a circular head, i.e. in the shape of a "U." Again, in all of the prior tape applications, direct physical contact with an optical head was necessary.

However, with the advent of optical tape, as an offshoot of the original and widely distributed video disk, the requirement that the tape be flexible required that it be a first-surface recordable medium rather than the second-surface recordable medium inherent in said video disk. As a first-surface recordable medium, optional tape is subject to foreign matter and particulate contamination on the surface thereof as well as potential damage by physical contact to the relatively fragile tape laminates and alteration or destruction of data thereon. Such problems either did not exist or were nominal with respect to video disks.

An optically recordable WORM (write once read many times) video disk usually consists of a relatively inflexible, premolded polymethylmethacrylate (PMMA), polycarbonate or polyolefin substrate with either spiral or concentric grooves embossed thereon, to which is superimposed, in one version, a very thin metallic or reflective layer, then a very thin dye polymer, photoreactive layer, and finally a relatively thick transparent protective coating. While the disk is spun, data bits are recorded in said spiral or concentric paths and read by light beam means in an optical head having a coarse path-tracking adjustment by radial movement of said head across and immediately above the surface of said disk, and a fine adjustment in the form of a galvano mirror and a voice coil operated objective lens combination to reflect and focus said beam to a spot on a recordable or recorded path. Since said path is spirally or concentrically spaced per turn of the disk at a pitch of about one and one-half micrometers (1.5 um), while the path is about a half micrometer (0.5 um) in diameter, typical dust particles being in the realm of a micrometer (1.0 um) or so in size lying on the recordable dye polymer laminate could obscure or completely eclipse data if it were not for the fact that the protective layer of a typical optical disk is in the realm of a millimeter (mm) or $10^3$ um in thickness. Dust particles on the surface of a typical optical disk lie approximately 1.0 mm from the dye polymer (photo reactive) laminate. A typical converging write/read light beam has a relatively high numerical aperture (NA), in the order of NA=0.5 or more, resulting in a solid cone, the apex of which is on the photosensitive dye polymer surface, the cone being truncated from the optical disk air-substrate interface. The area so intercepted by the beam at said interface is nominally 1.05 $mm^2$ or over $10^6$ $um^2$. With this understanding, it may be seen that several dust particles in the micrometer realm may be tolerated at any given spot on a functioning optical disk without affecting reading or recording of the photoreactive laminate there below.

Optical tape, on the other hand, is conventionally made of a relatively thin and flexible laminate of polyethylene terephthalate (PET) or the like, superimposed with a very thin subbing layer to smooth out the PET surface, to which is added a vacuum deposited layer of aluminum, then a dye polymer, photoreactive layer, and finally a thin anti-abrasion coating. All laminates together total approximastely 25 um. Since the anti-abrasion layer of optical tape is much thinner, in the order of a few micrometers, than the protective layer of the optical disk, in the order of $10^3$ micrometers, it should be readily apparent that dust particles of a micrometer or so in size, lying on the tape surface and merely a few micrometers distant from the optically active laminate, occlude significant data to be recorded, or data already recorded thereupon.

In addition, although prior art magnetic tape applications utilized conventional capstan and pinch roller means to propel and regulate speed of magnetic tape by direct physical contact with the tape surface, such means is highly undesirable if not impossible with optical tape. The necessarily very thin anti-abrasive coating of optical tape cannot be subjected to normal wear and tear of physical contact with a moving surface. And, of course, the slightest abrasion or scratching of the surface of optical tape can and will cause undesired, reflections, defractions, refractions, dispersion or diffusion of a laser beam.

Therefore, there exists a need for a tape cartridge or cassette possessing the convenience and utility of typical magnetic tape cassettes or cartridges, yet having means adapted to the unique characteristics and needs of optical tape; i.e. elimination of any possibility of particle contamination and any direct physical contact with tape recording surfaces, and providing necessary focussing, tracking and aligning characteristics inherent to optical recording media.

By providing alternate means for tape propulsion and speed control, by implementing unique focus, alignment and tracking means, and by providing a environmentally sealed cartridge design, the invention disclosed herein offers novel solutions to existing problems of broad utilization and commercial application of most optical tape recording media.

SUMMARY OF THE INVENTION

The invention conceives a sealed optical tape cartridge having waggle stick through flexible membrane means for driving tape reels without need for conventional capstan and pinched roller means of other tape cartridges or cassettes. Optical tape is pulled across a movable recording bridge with the optically active side of the tape facing outwardly. The bridge is positioned immediately adjacent an optically transparent window through which a laser beam passes to read/record data on the tape. The optical bridge incorporates the dynamic focussing and tracking functions of the optical path traditionally located between an objective lens and a light beam source. The bridge is operated upon by servo-controlled levers (pins) to incline the tape from direction of tape travel for proper alignment of surface of the tape parallel to the plane of a rotating multi-lens optical head, to move the tape dynamically in direction of tape travel for proper tracking, and to move the surface of the tape normal to direction of travel for proper dynamic focus.

OBJECT OF THE INVENTION

It is therefore a primary object of the invention to provide an optical tape cartridge, and thereby enable much greater data density recording and greater ease of recording via tape media.

A further object of the invention is to provide a tape cartridge that is sealed from environmental contaminates.

Still another object is to provide, by comparison with a magnetic tape cartridge, an optical tape cartridge with substantially fewer components to assemble for ease and economic manufacture thereof and for increasing useful life/longevity of the tape cartridge.

Another object is to increase tape longevity by substantially diminishing conventional tape wear and tear by eliminating capstan and pinch roller means required in magnetic tape cartridges, and eliminating conventional head wrap means, i.e. direct physical contact of tape with head.

A further objective is to incorporate a tape motion path such that no element bears upon nor touches the recordable surface/side of the tape. Yet another object of the invention is to eliminate necessity of pulling tape out of cartridge for reading and recording as is typical for prior art tape cartridges/cassettes.

Still another object of the invention is to eliminate typical magnetic tape cartridge problems of temporary loss of use due to dew precipitation.

Yet another object is to eliminate dust and contaminates from interior of cartridge not only to increase life of tape and cartridge components by less wear and tear but also to decrease data dropouts from tape and thereby increase reliability.

Another object is to eliminate necessity of periodic rewinding, tails-in, tails-out, and re-recording as is customary for prior art tape applications.

Still a further object is to eliminate traditional high mechanical tension required in existing tape head loops for tight head to tape pressure in order to reduce 68 d/2 loss.

Yet another object is totally to encapsulate all cartridge parts and tape to avoid casual contact and possible damage thereto.

Still a further object of the invention is to provide a semi-porous membrane in the cartridge to permit equalization of air pressure inside and outside, yet which will not allow flow there through of dust or moisture.

Yet another object of the invention is to incorporate, for optical track generating and tracking means as well as track focussing means, optical functions within the cartridge rather than in an optical head as exists in prior art.

The foregoing and other further objects of the invention will become more obvious in view of the attached drawings and the following description of a preferred embodiment when read in light of the appended claims.

DESCRIPTION OF A PREFERRED EMBODIMENT

The optical tape cartridge disclosed herein relates to an application of optical tape of the type, for example, manufactured by Imperial Chemical Industries also known as ICI Image Systems of the United Kingdom. ICI optical tape can be manufactured in wide and long webs of polyethylene terephthalate (PET) as a base, coated with various layers: a subbing layer interrelated to smooth out the surface of the PET base, a vacuum deposited layer of aluminum, a dye polymer coating, and an anti-abrasion coating. The total thickness of the multilayered optical tape may be in the range of 25 um to 75 um. In the cartridge described herein, optical tape utilized is approximately 19 mm wide and approximately 100 meters in length.

Figure 1:
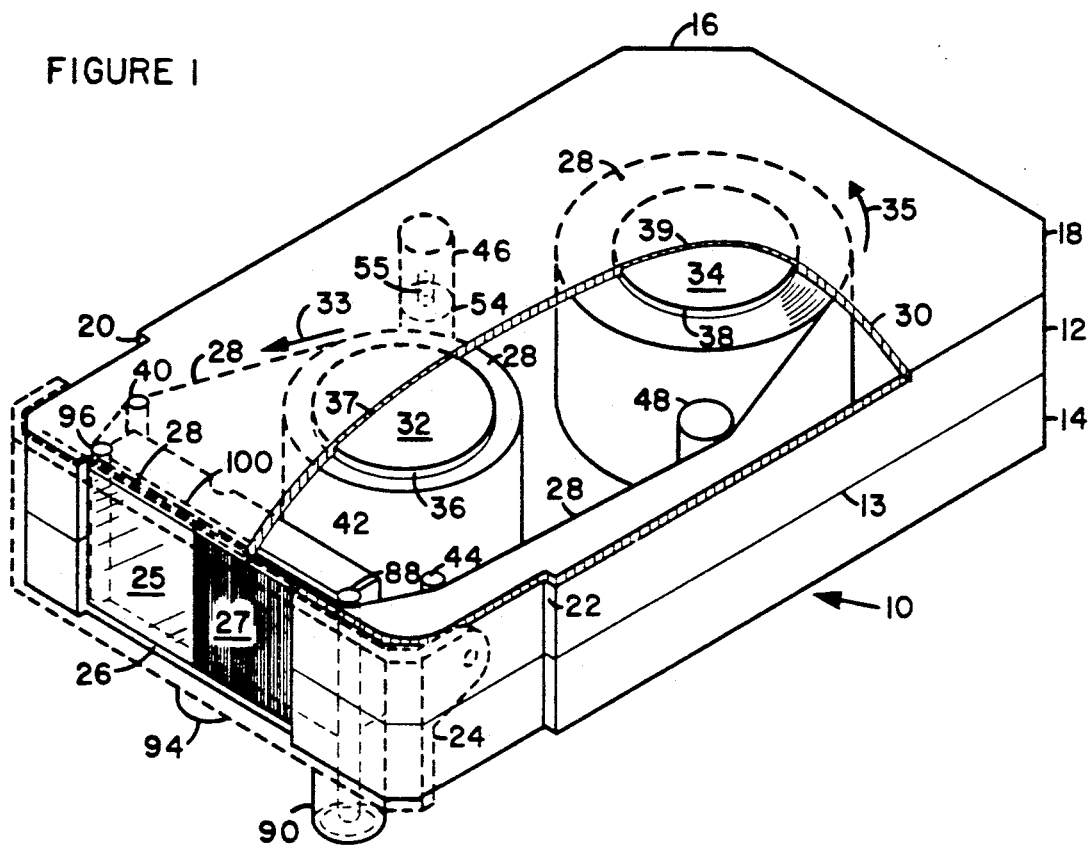
FIG. 1 illustrates an upper cut away and see-through isometric view of the optical tape cassette invention.

Referring now to FIG. 1, a semi-transparent and cut away, isometric, top view of the sealed optical tape cassette 10 is illustrated. The tape cassette housing may be constructed of a premolded, opaque plastic or light metal first and second halves 12 and 14, configured to be sealed on assembly by a tongue and groove or similar mating surface 13. Distal corners 16 and 18 of cassette 10 may be typically truncated for space conservation and to avoid possible injury from sharp corners. Forward indentations 20 and 22 are provided for keyed and stabilized insertion of cassette 10 into a seat of a recorder/player device and further allow for containment of, and rotary movement of, an opague plastic or light metal window shield 24.

Figure 2:
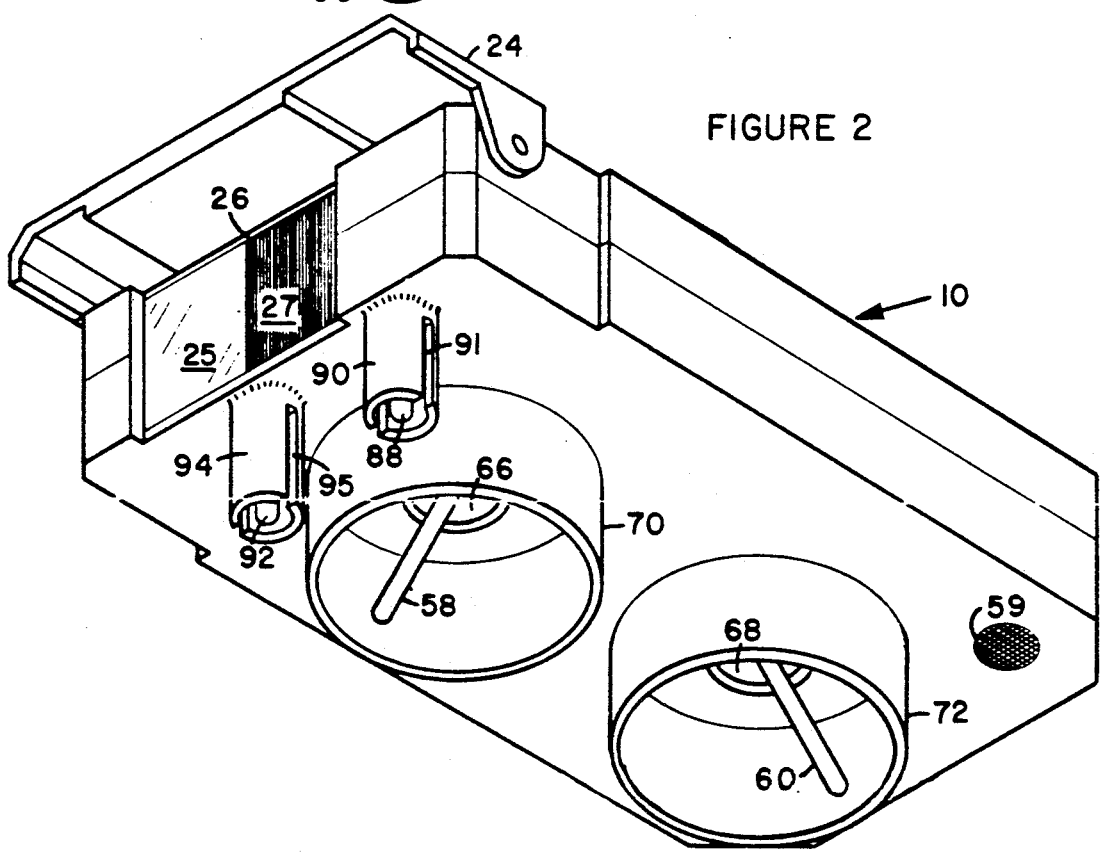
FIG. 2 illustrates a bottom view of FIG. 1.

Window shield 24, illustrated in a closed position in FIG. 1, is illustrated in an open (playing/recording) position in FIG. 2. Window shield 24 is spring loaded to be held normally closed and is configured to open automatically when inserted into a recorder/player by appropriate opening means provided in the recorder/player. Window shield 24 in addition to serving as a protective shield to prevent physical scratching or marring of the surface of an optically transparent window 26 also prevents alteration or damage to a continuum of optical tape 28 or to data thereon immediately behind window 26 by accidental, high intensity, electromagnetic radiation, e.g. ultraviolet (uv) light. Window 26 may be any of various optically transparent materials, glass or plastic, configured to be conventionally sealed with cartridge 10, and consists of an optically transparent half 25 and an optically opaque half 27.

A cut-away view 30 of cartridge 10 is provided in FIG. 1 to disclose how optical tape 28 is wound on first and second tape reels 32 and 34, respectively, situated therein. Optical tape 28 is wound on reels 32 and 34 with the optically active side facing outward. For purposes of illustration in FIG. 1, first reel 32 will be considered a tape-feed reel while second reel 34 will be considered a tape take-up reel such that reels 32 and 34 rotate according to respective arrows 33 and 35 as indicated in FIG. 1 with the optically active side of tape 28 facing outwardly from reels 32 and 34 and therefore not coming into contact with any other component. It is understood, however, being conventional to the art, that reels 32 and 34 are rotatable in either direction and alternatively serve as feed and take up reels.

Extension 36 and 38 of the hubs of reels 32 and 34 are configured to fit into frictionless circular recesses 37 and 39 in upperhalf 12 of cartridge 10 to provide stability and confinement of reels 32 and 34. Additional strength and support to cassette 10 is obtained by a first and second support posts 46 and 48 which are provided with respective male/female coupling junctures 54 and 55, as molded parts of cartridge halves 12 and 14. First support post 48 also serves as a direction post to direct flow of optical tape 28 onto or from reel 34. As optical tape 28 leaves feed reel 32, with the tape recording surface facing outwardly, tape 28 slides around a first direction post 40, passes over a focusing-tilting-tracking (FTT) bridge 42, to a second directing post 44, to support post 48, which is also a third directing post 48 and hence to take-up reel 34.

First and second directing posts 40 and 44 are each provided with spring positioning means, not shown in drawing as being conventional in the art and thereby provide a degree of compliance for motion of tape 28. An isometric bottom view of cartridge 10, depicted in FIG. 2, illustrates first and second reel-drive waggle sticks 58 and 60, respectively, and FTT bridge 42 focusing pin 92 and tilting/tracking control pin 88, respectively. Pins 92 and 98 are also shielded by cylindrical extensions 94 and 90, respectively. Protective extensions 90 and 94 are further provided with slot means 95 and 91, respectively, to enable proper coupling of FTT controls in a recorder/player. It should be understood that the means for concentrically engaging and actuating pins 92 and 88 are functional components of a recorder/player, and, not being part of this invention, are not illustrated nor explained.

FTT bridge, 42, is of low mass in proportion to its rigidity, as achieved through the art of blow molding. Tape turning posts, 96 and 88, are bonded to the outward and vertical corners of bridge 42, and are made of low-mass polished glass or metallic tubing.

Waggle sticks 58 and 60 diagonally pass through the centers of circular flexible membranes 66 and 68, respectively, on the bottom of cartridge 10. Membranes 66 and 68, which may be circular pads of elastomer, are bonded around their peripheries to the bottom of cartridge 10 and at their centers to waggle sticks 58 and 60. Circular waggle stick shield extensions 70 and 72 from bottom of cartridge 10, provide a protective barrier within which each waggle stick 58 or 60 is free to rotate its path in the form of two cones joined at their apices, located at the center of membrane 66 or 68, respectively.

A semi-porous membrane filter 59 is also provided in bottom of cartridge 10 to allow equalization of gas pressure inside and outside of the cartridge while at the same time maintaining a dust and moisture free, fully enclosed interior.

Figure 3A:
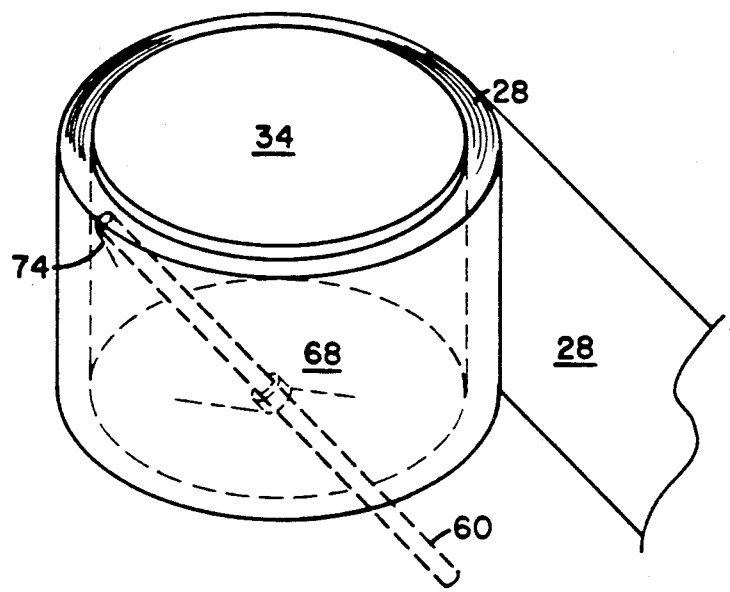
FIG. 3a illustrates a see-through view of a tape reel and waggle stick drive means.

Referring now to FIGS. 3a, b and c, a more illustrative view of waggle sticks 58 and 60 reel drive means is provided in a see-through exploded view. For purposes of illustration only one reel will be discussed, but concept, of course, is applicable to both. FIG. 3(a) depicts a second reel 34 with a layer of optical tape 28 thereon and extending therefrom. Waggle stick 60 is shown to be movably positioned in a circular hole 74 which extends diagonally toward the bottom and center of solid reel 34. Hole 74 provides an accurate but slip-fit engagement with pin 60, which is free to rotate about its own longitudinal axis with respect to solid reel 34.

Figure 3B:
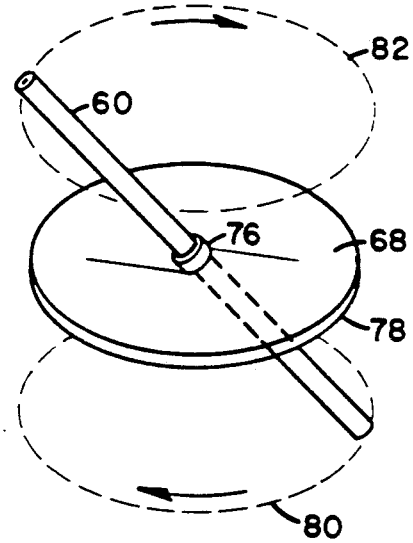
FIG. 3b illustrates operation of waggle stick and flexible membrane.

FIG. 3(b) illustrates the sealed rotary motion of waggle stick 60. Waggle stick 60 passes centrally through flexible membrane 68 at its center adjacent to the bottom of reel 34 and is bonded by collar means 76 so that it cannot rotate abouts its own axis without respect to membrane 68. Outer periphery 78 of membrane 68 is in turn bonded by means conventional in the art about its edge to an open hole in the bottom of cartridge 10. It can be observed that as waggle stick 60 is rotated in a clockwise motion indicated by dashed circle 80, the opposite end of waggle stick 60, being positioned within reel 34, will cause reel 34 to rotate likewise in a clockwise circular manner indicated by dashed circle 82.

Figure 3C:
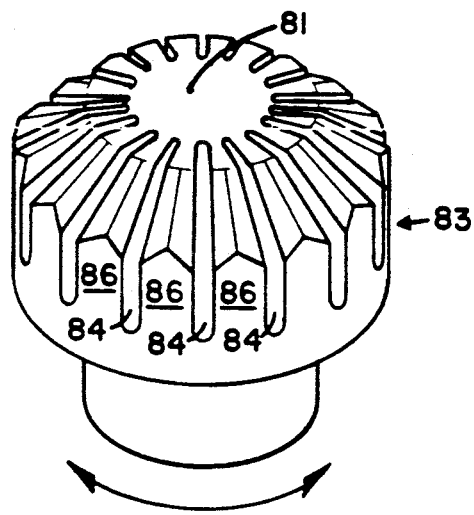
FIG. 3c illustrates drive rotor into which waggle stick will automatically seat and position itself.

FIG. 3(c) depicts a drive means 83, a component of recorder/player, that typically may be utilized to rotate conveniently waggle stick 60. Waggle stick drive means 83 has a multiplicity of identical slotted channels 84 extending radially outward from the center 81 thereof. Each slot 84 has parallel walls apart by a distance only slightly greater than diameter of waggle stick 60. Recessed channels/slots 84 are separated by gabled, sloped protuberances 86, which guide waggle stick 60 into a slot 84 when cartridge 10 is set onto a recorder/player seat. It should be apparent that waggle stick drive means 83 is designed to slide with clearance into and rotatably fit within shield 72. Waggle stick drive means 83 may rotate reel 34 in either direction at the velocities required for record, reproduce, fast forward and rewind.

Referring now back to FIG. 1, the novel features of FTT bridge 42 will be more clearly discussed. Bridge 42 consists of a hollow, blow-molded plastic, rectangular box suspended at one end thereof by a tracking/tilting control pin 116. The upper portion of control pin 116, as well as its counterpart pin 96, is of polished alloy metal or glass to offer a turn-around post of relatively low friction for the optical tape. As indicated in FIG. 2, control pin 116 extends down through the bottom of cartridge 10 and is enclosed by a protective shield 90. FIG. 1 does not disclose a hidden focussing control pin 92, affixed to the rear of bridge 42; however, focussing control pin 92 also passes through the bottom of cartridge 10 and is enclosed by a protective shield 94.

Figure 4A:
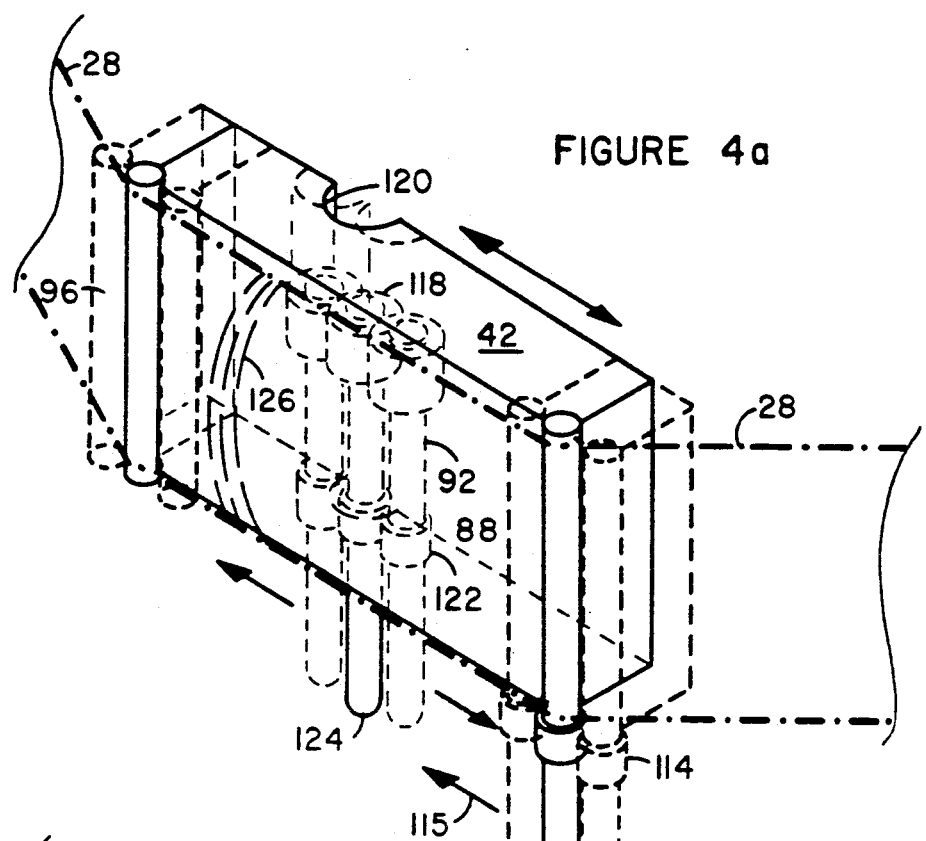
FIG. 4a illustrates a see-through view of construction and operation of recording bridge with ability to be moved in the longitudinal (parallel to optical window) direction of tape travel for tracking.

FIGS. 4a, b and c provide a clearer illustration of the function and operability of FTT bridge 42. In FIGS. 4a, b and c, optical tape 28, is illustrated during a playing or recording process, passing over a first bridge directing post 96, across the face 100 of FTT bridge 42 and over a second bridge directing post 88 which, of course, is rigidly related to tracking control pin 116.

Figure 4B:
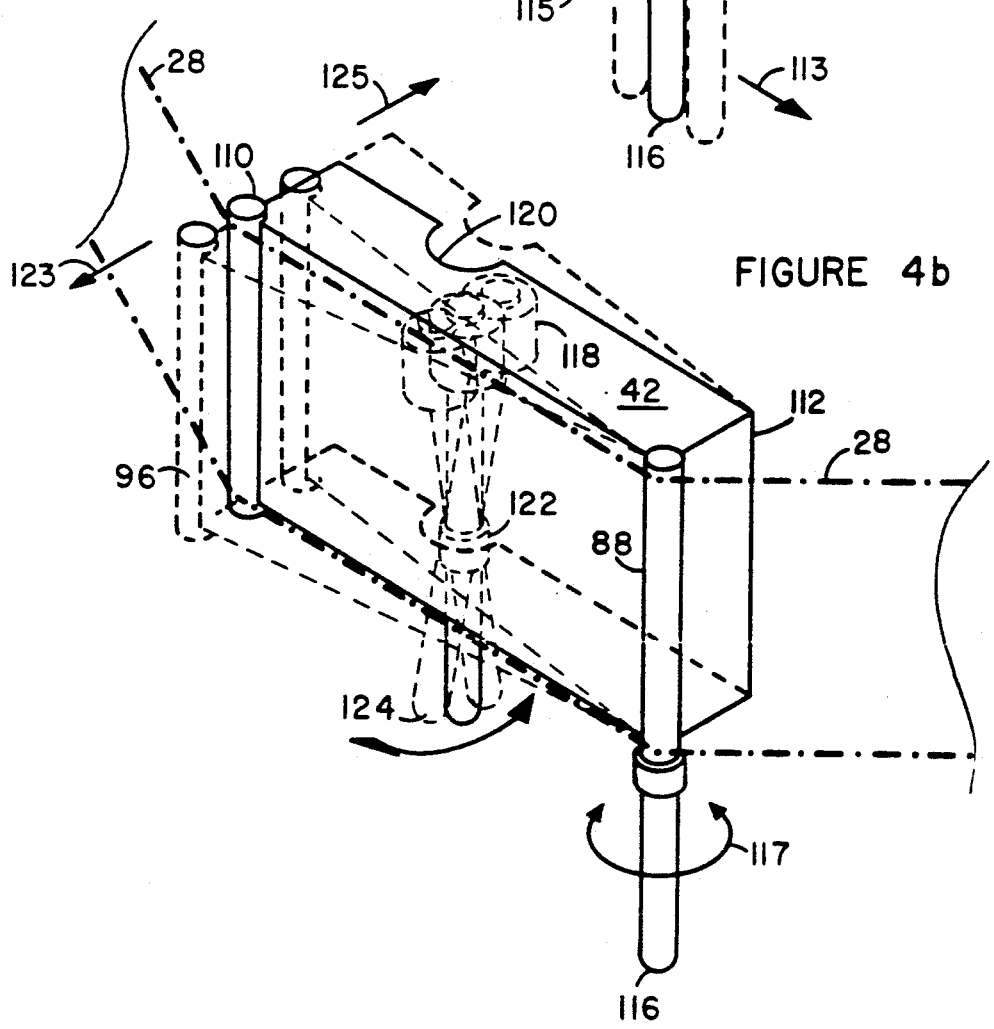
FIG. 4b illustrates movement of bridge orthogonally (normal to optical window) to direction of tape travel for focusing.
Figure 4C:
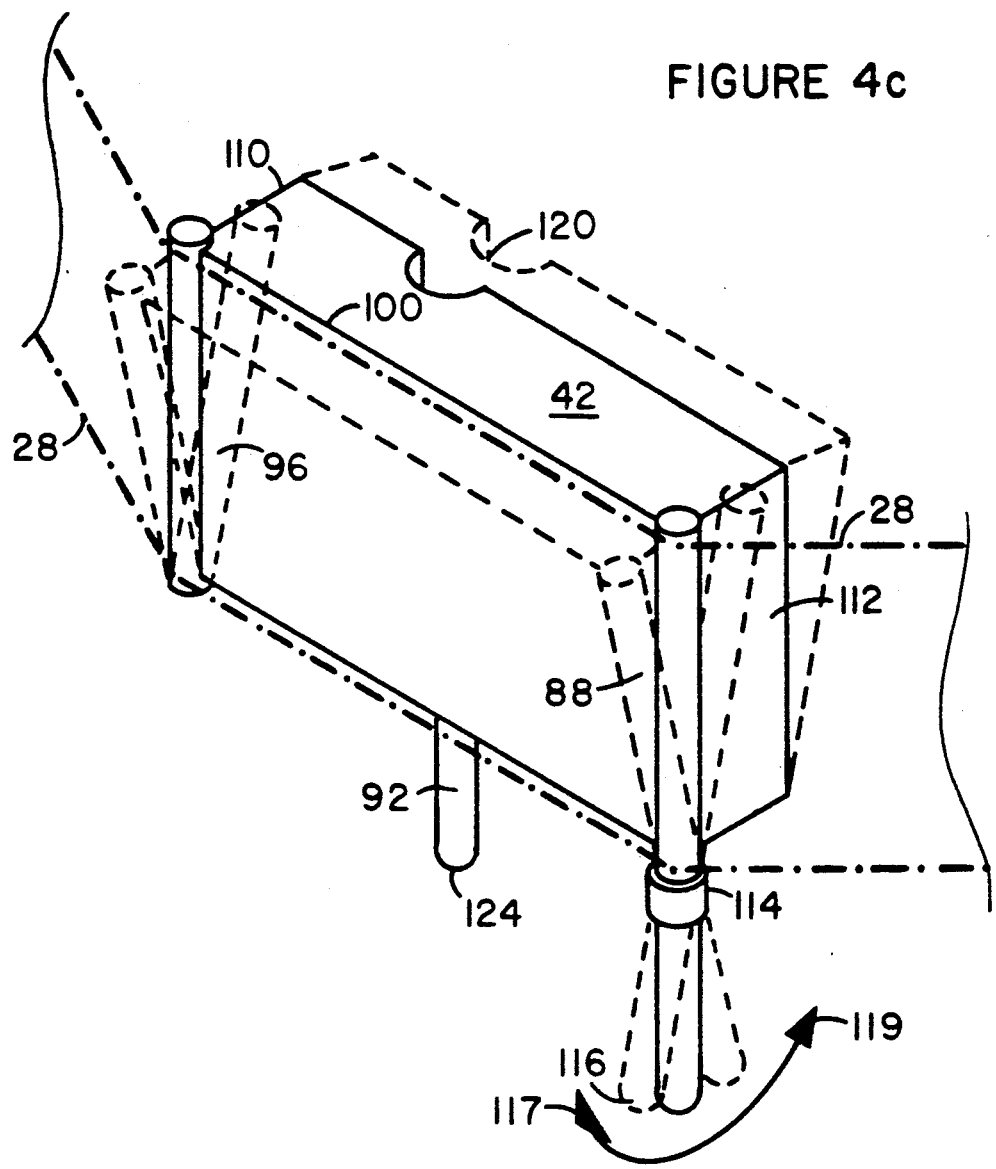
FIG. 4c illustrates tilting movement capability of the recording bridge.

As indicated in FIG. 4b, bridge 42 is designed to have a free swinging end 110 and a pivoting and hinged end 112. Pivot and hinged end 112 is bonded to tracking alignment control pin 116. Pin 116 is secured by a rubber grommet seal 114. Rubber grommet 114 provides a multifaceted function: grommet 114 secures a point of flexible attachment of pin 116 to cartridge 10; grommet 114 also seals interior of cartridge 10 from external contaminants; and Grommet 114 allows lateral movement, illustrated in FIG. 4a, and rotational movement illustrated in FIG. 4b, of pin 116 and, of course, attached bridge 42, i.e. movement parallel to face 100 of bridge 42, indicated by arrows 113 and 115, FIG. 4a, and rotational movement indicated by arrow 117, FIG. 4b. By FIG. 4a movement, instantaneous optical tracking corrections and adjustments can be made to accommodate any variation in tape 28 speed across bridge 42 by operation upon by a distal end of pin 116 by appropriate means situated in the playing/recording apparatus. There being no conventional capstan/pinch roller means to control tape speed in cartridge 10, it is necessary to have tracking correction capability. In addition, FIG. 4c indicates that grommet 114 also provides for a tilting degree of motion indicated by arrows 117 and 119. Tilting pin 116, and of course attached bridge 42, accommodates need for slight optical tape misalignment corrections arising out of slight variations from ideal alignment of cartridge 10 and tape therein with respect to the plane of rotation of the objective lenses of the rotating player/recorder optical head in the vertical axis shown. Alignment corrections are likewise accomplished by operation upon distal end of pin 116 by appropriate alignment correction means situated in the respective player/recorder.

Referring again to FIG. 4b, proper focusing of an optical beam on optical tape 28 is accomplished by operation of focusing pin 92. Pin 92 is flexibly attached by a rubber grommet 118 bonded to a grooved channel 120 centrally positioned down the rear of bridge 42. In a manner similar to alignment/tracking pin 116, focusing pin 92 passes through a flexible rubber grommet 122 which seals cartridge 10 from outside contaminants. Distal end 124 of pin 92 is similarly operated upon by appropriate focusing control means in the player/recorder. By proper manipulation of distal end 124 of focusing pin 92, and with coordination and rotation of pin 88, a forward and backward movement of bridge 42 is accomplished as indicated by arrows 123 and 125, thereby enabling proper focus of an optical beam from the player/recorder head by means of conventional magneto mechanical or other appropriate recorder/player means.

Actual playing and recording are accomplished by aligning, tracking and focussing an optical beam from a rapidly spinning optical head in the player/recorder. Focus of the beam is made in a zone through transparent window 25 for record and playback on optical tape 28 on the left most side, i.e. free swinging side 110 of bridge 42. Tape in this zone of recording is free to move normal to the surface of window 25 for proper focus, lateral/parallel to window 25 for proper tracking, and at an angle/tilt to window 25 for proper alignment. Actual recording is thereby made across the face of optical tape 28 in consecutive parallel arcs 126 indicated in FIG. 4a, which are set by the circular geometry of the optical head and the synchronous movement of tape 28.

By such means an environmentally sealed and protected optical tape cartridge is conceived with diverse practical applications and various obvious modifications. Therefore, although there has been described herein above a particular arrangement of a sealed optical tape cartridge for purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. An optical tape cartridge, comprising:
   sealed cartridge housing;
   first and second tape reels disposed within and freely rotatable in either direction within said housing, said reels acting as tape feed and take up reels;
   means for driving each of said reels while maintaining a sealed interior environment within said housing;
   an optical tape having a first surface, optically recordable side wound on and coupling each of said first and second reels by a segment of said tape wherein said optically recordable side faces outwardly from each said reel;
   sealed window means on a surface of said housing disposed across a portion of said tape segment for enabling optical recording on and reading from said segment of optical tape;
   tape bridge means, disposed within said housing parallel to and in alignment with said window means, for focusing an optical beam on said segment of optical tape during read/record process, for tracking said optical beam during read/record processes, and for tilting said segment of optical tape;
   protective cover means disposed across said window means for protecting said window from physical harm, and for protecting said optical tape from contact with accidental electromagnetic radiation;
   filter means extending through said housing for equalizing any internal/external variation of air pressure while maintaining a clean and moisture-free interior of said housing.

2. An optical tape cartridge, comprising:
   a sealed housing having an optically transparent window;
   filter means contained within said housing, said filter means operative in allowing free air flow therethrough while preventing flow of moisture and particulate matter;
   tape reel means, disposed within said housing for storing, feeding, and taking up tape;

a segment of optically recordable tape disposed within said tape reel means and passing across said optically transparent window;

external means for internally driving said tape reel means; and tape guide and orientation means for positioning tape during recording and reading processes to obtain proper focussing, tilting, and tracking of an optical beam on said tape.

3. An optical tape cartridge according to claim 2, wherein said tape reel means consists of a tape feed reel and a tape take up reel coupled together by said segment of said tape.

4. An optical tape cartridge according to claim 2, wherein said tape reel drive means consists of a rod (waggle stick) centrally and diagonally passing through and sealed with a pliant and flexible membrane, said rod being coupled to an interior point of said tape reel for turning said reel and said membrane being sealed with said housing.

5. An optical tape cartridge according to claim 2, wherein said tape guide and orientation means consists of a mobile bridge across which tape may pass during recording and reading processes, said bridge having tape confining means beyond ends thereof.

6. An optical tape cartridge according to claim 5, wherein said mobile bridge is operated upon by a tracking pin.

7. An optical tape cartridge according to claim 5, wherein said mobile bridge is operated upon by an tilting pin.

8. An optical tape cartridge according to claim 5, wherein said mobile bridge is operated upon by a focussing pin.

* * * * *